United States Patent
Kim et al.

(10) Patent No.: US 11,978,921 B2
(45) Date of Patent: May 7, 2024

(54) METHOD OF MANUFACTURING SEPARATOR-COMPOSITE ELECTRODE COMPRISING MULTILAYER-STRUCTURED INORGANIC LAYER AND SEPARATOR-COMPOSITE ELECTRODE MANUFACTURED THEREBY

(71) Applicant: LG ENERGY SOLUTION, LTD., Seoul (KR)

(72) Inventors: Kyoung Ho Kim, Daejeon (KR); Bum Young Jung, Daejeon (KR); Jeong Gil Kim, Daejeon (KR); Jung Gu Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/792,999

(22) PCT Filed: Jan. 26, 2021

(86) PCT No.: PCT/KR2021/001005
§ 371 (c)(1),
(2) Date: Jul. 14, 2022

(87) PCT Pub. No.: WO2021/153966
PCT Pub. Date: Aug. 5, 2021

(65) Prior Publication Data
US 2023/0066443 A1    Mar. 2, 2023

(30) Foreign Application Priority Data

Jan. 31, 2020  (KR) .................. 10-2020-0011990
Jan. 14, 2021  (KR) .................. 10-2021-0005334

(51) Int. Cl.
*H01M 4/00*  (2006.01)
*H01M 4/139*  (2010.01)
(Continued)

(52) U.S. Cl.
CPC ......... *H01M 50/403* (2021.01); *H01M 4/139* (2013.01); *H01M 50/446* (2021.01); *H01M 50/449* (2021.01); *H01M 50/46* (2021.01)

(58) Field of Classification Search
CPC .. H01M 50/403; H01M 4/139; H01M 50/446; H01M 50/449; H01M 50/46;
(Continued)

(56) References Cited

U.S. PATENT DOCUMENTS

2005/0221192 A1   10/2005  Hennige et al.
2008/0102361 A1   5/2008   Lee et al.
(Continued)

FOREIGN PATENT DOCUMENTS

JP    2011-171290 A    9/2011
JP    2015-038012 A    2/2015
(Continued)

OTHER PUBLICATIONS

Machine translation of KR-2008/0082289-A, obtained from PE2E (Year: 2008).*

(Continued)

*Primary Examiner* — Nicholas P D'Aniello
(74) *Attorney, Agent, or Firm* — Morgan, Lewis & Bockius LLP

(57) ABSTRACT

The present invention relates to a method of manufacturing a separator-composite electrode having a multilayer-structured inorganic layer and a separator-composite electrode manufactured thereby. The present invention provides a method of manufacturing a separator-composite electrode and a separator-composite electrode using the same, wherein there is no separator substrate by forming an inorganic layer serving as an insulating layer in multiple layers, thereby safety is improved and the capacity of a battery is not reduced compared to a conventional battery.

19 Claims, 7 Drawing Sheets

(51) Int. Cl.
*H01M 50/403* (2021.01)
*H01M 50/446* (2021.01)
*H01M 50/449* (2021.01)
*H01M 50/46* (2021.01)

(58) Field of Classification Search
CPC ............. H01M 50/443; H01M 50/431; H01M 50/434; Y02E 60/10
See application file for complete search history.

(56) References Cited

U.S. PATENT DOCUMENTS

| | | | |
|---|---|---|---|
| 2009/0269489 A1* | 10/2009 | Hennige | H01M 10/052 |
| | | | 427/126.2 |
| 2010/0291293 A1 | 11/2010 | Hennige et al. | |
| 2015/0050533 A1 | 2/2015 | Nam et al. | |
| 2016/0149184 A1 | 5/2016 | Nam et al. | |
| 2016/0211554 A1 | 7/2016 | Umeyama et al. | |
| 2017/0222278 A1 | 8/2017 | Kwon et al. | |
| 2017/0250400 A1* | 8/2017 | Ai | H01M 4/623 |
| 2018/0166682 A1 | 6/2018 | Lee et al. | |
| 2019/0020008 A1* | 1/2019 | Kim | H01M 50/446 |
| 2019/0207202 A1* | 7/2019 | Wang | H01M 4/525 |
| 2019/0319238 A1 | 10/2019 | Ikoma et al. | |
| 2020/0212400 A1 | 7/2020 | Han et al. | |
| 2021/0036332 A1* | 2/2021 | Kawamoto | H01M 10/0525 |

FOREIGN PATENT DOCUMENTS

| | | |
|---|---|---|
| JP | 2016-134237 A | 7/2016 |
| JP | 2018-508926 A | 3/2018 |
| KR | 10-0824851 B1 | 4/2008 |
| KR | 10-2008-0082289 A | 9/2008 |
| KR | 10-2010-0097767 A | 9/2010 |
| KR | 10-2013-0123568 A | 11/2013 |
| KR | 10-2014-0070207 A | 6/2014 |
| KR | 10-2015-0020022 A | 2/2015 |
| KR | 10-2015-0037394 A | 4/2015 |
| KR | 10-2015-0045786 A | 4/2015 |
| KR | 10-2016-0007147 A | 1/2016 |
| KR | 10-2016-0051660 A | 5/2016 |
| KR | 10-2016-0061165 A | 5/2016 |
| KR | 1-2016-0076363 A | 6/2016 |
| KR | 10-2016-0112266 A | 9/2016 |
| KR | 101880237 B1 * | 8/2018 ......... H01M 50/411 |
| KR | 10-2019-0084893 A | 7/2019 |
| WO | 2015-063997 A1 | 5/2015 |
| WO | 2018-155288 A1 | 8/2018 |

OTHER PUBLICATIONS

Frankenberger et. al, Laminated Lithium Ion Batteries with improved fast charging capability, Mar. 15, 2019, Journal of Electroanalytical Chemistry, vol. 837, pp. 151-158 (Year: 2019).*
Machine translation of KR-101880237-B1, obtained from PE2E (Year: 2019).*
Machine translation of KR-2008/0082289-A, obtained from KIPO (Year: 2008).*
International Search Report (with partial translation) and Written Opinion dated Apr. 29, 2021, for corresponding International Patent Application No. PCT/KR2021/001005.
Office Action issued in Japanese Patent Application 2022-536610 dated Jun. 26, 2023.
Office Action dated Nov. 2, 2023, issued in corresponding Korean Patent Application No. 10-2021-0005334.

* cited by examiner

[FIG. 1]
- Prior Art -
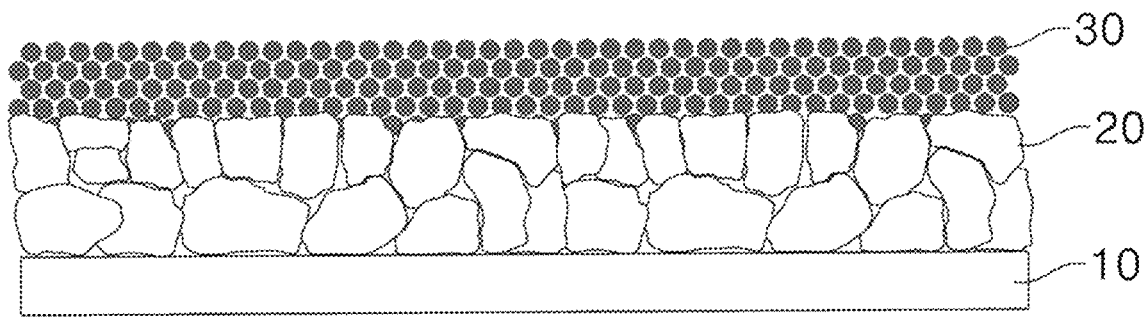

[FIG. 2]
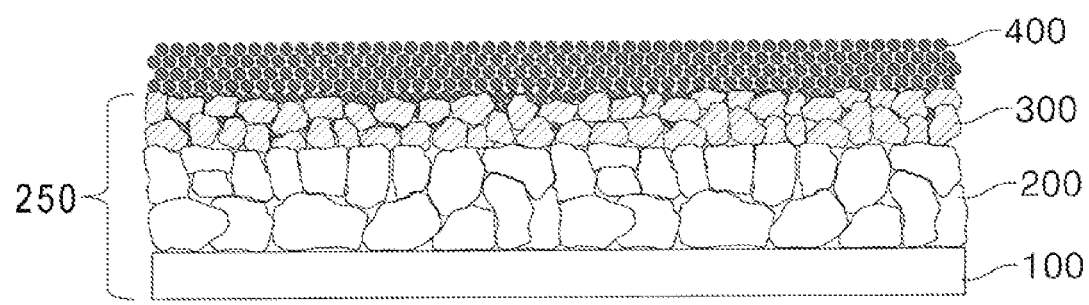

[FIG. 3]
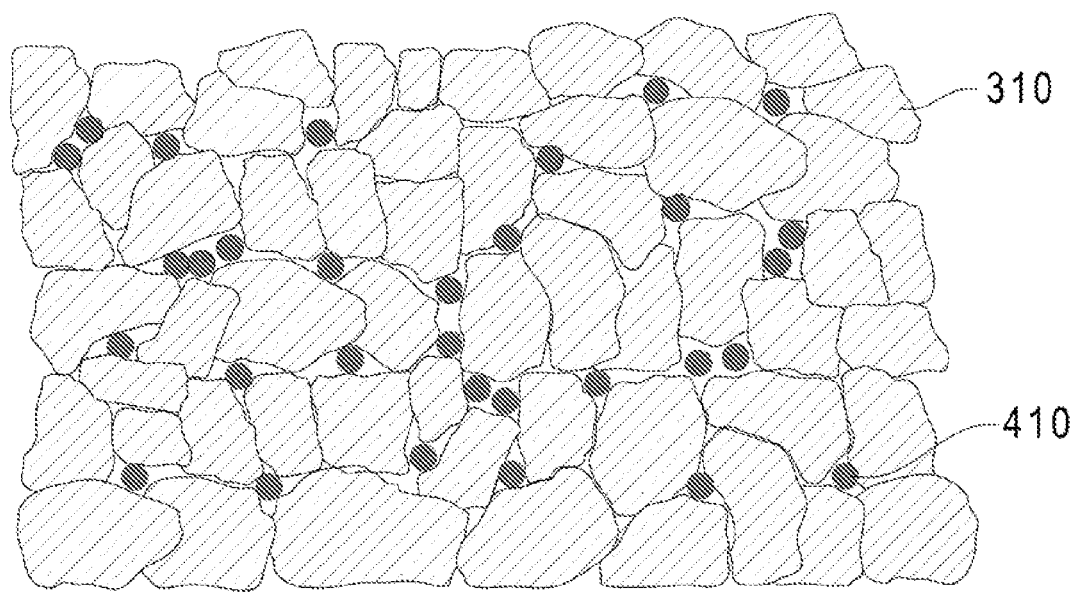

[FIG. 4]
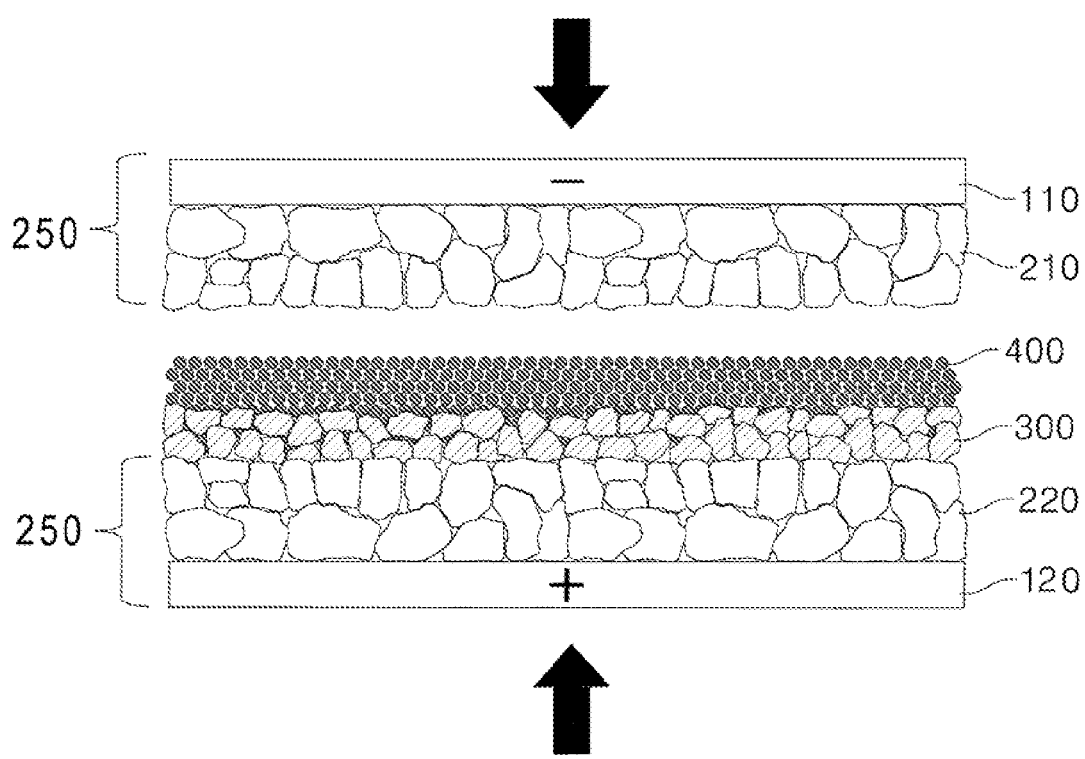

[FIG. 5]
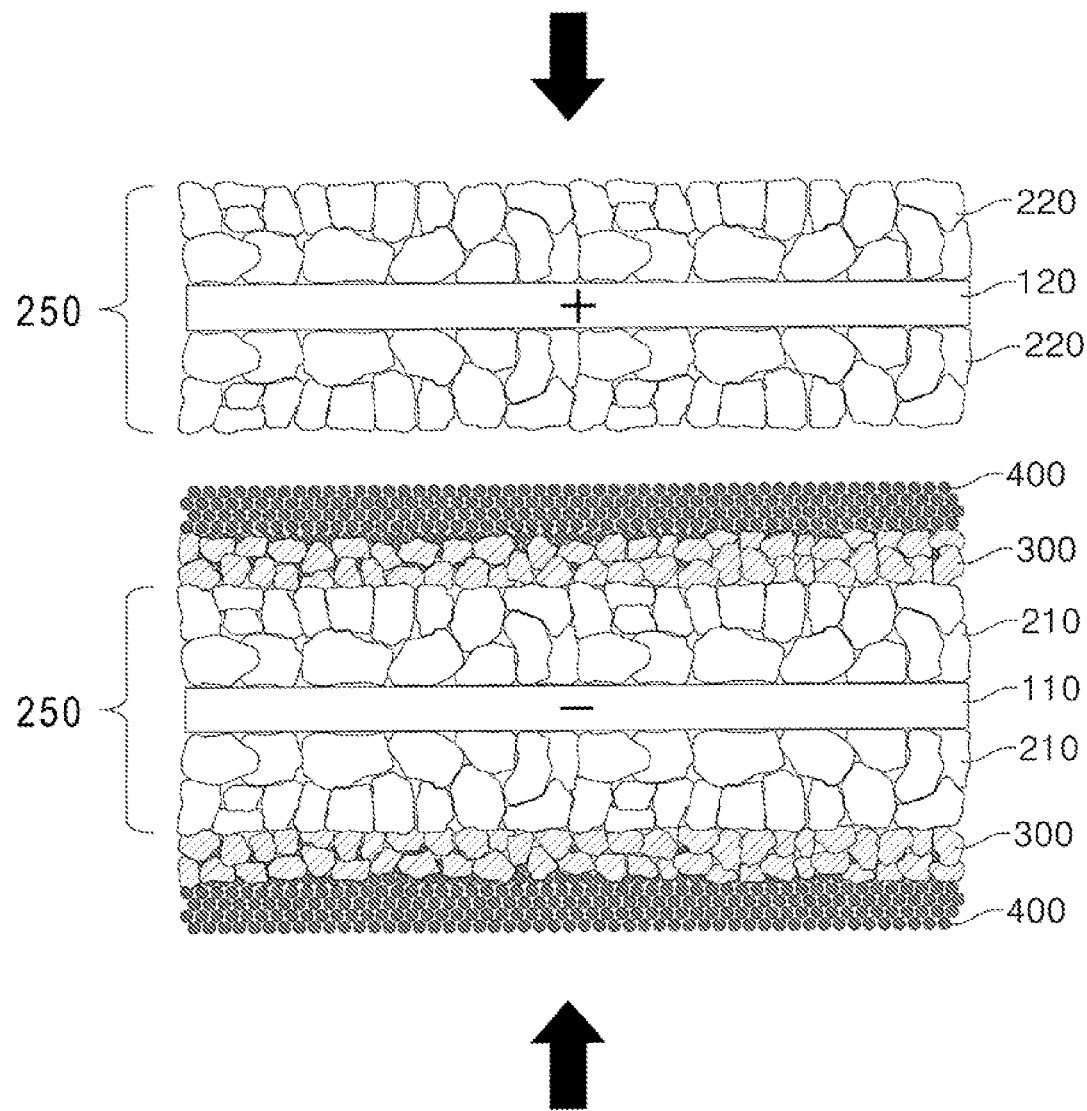

[FIG. 6]
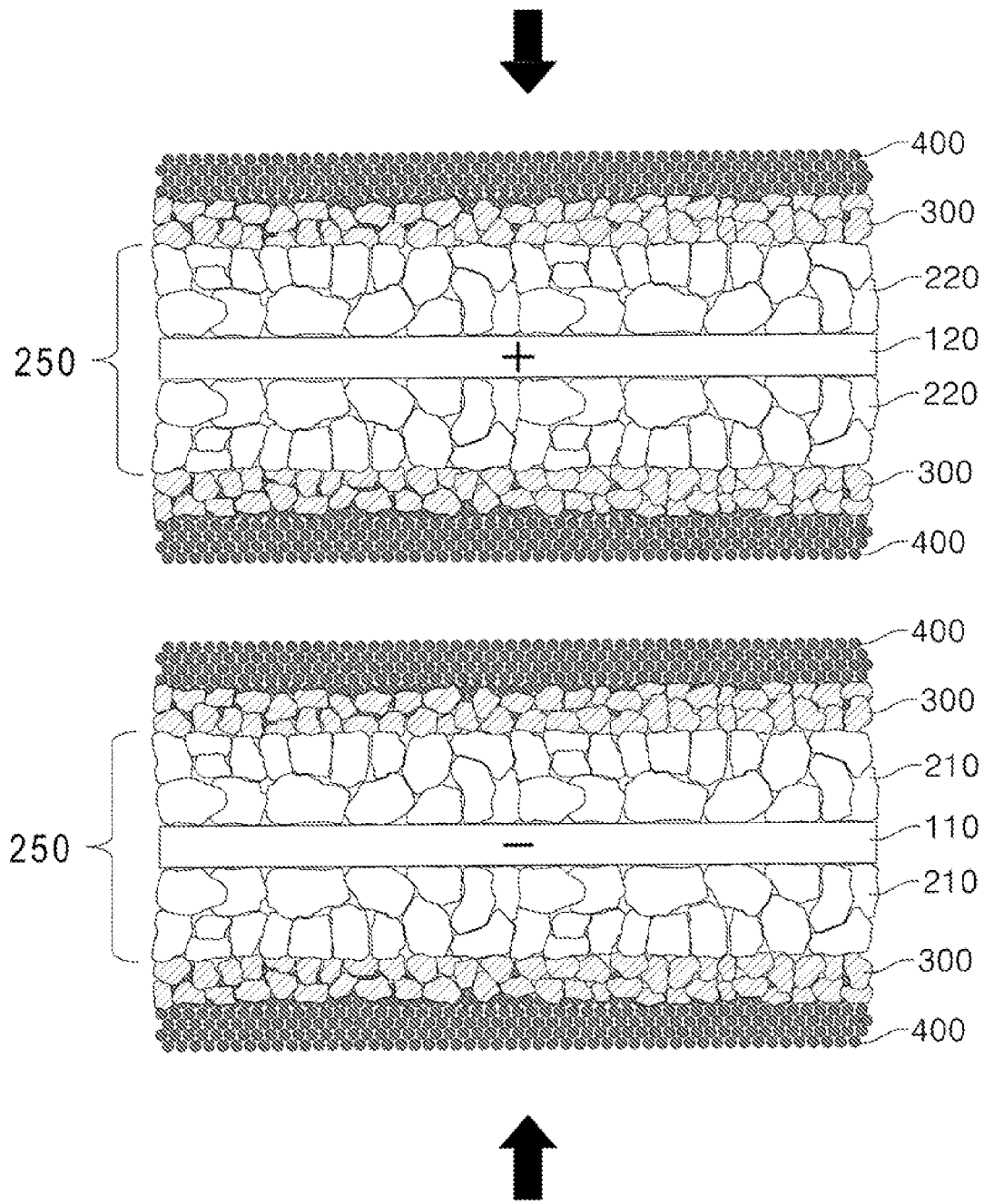

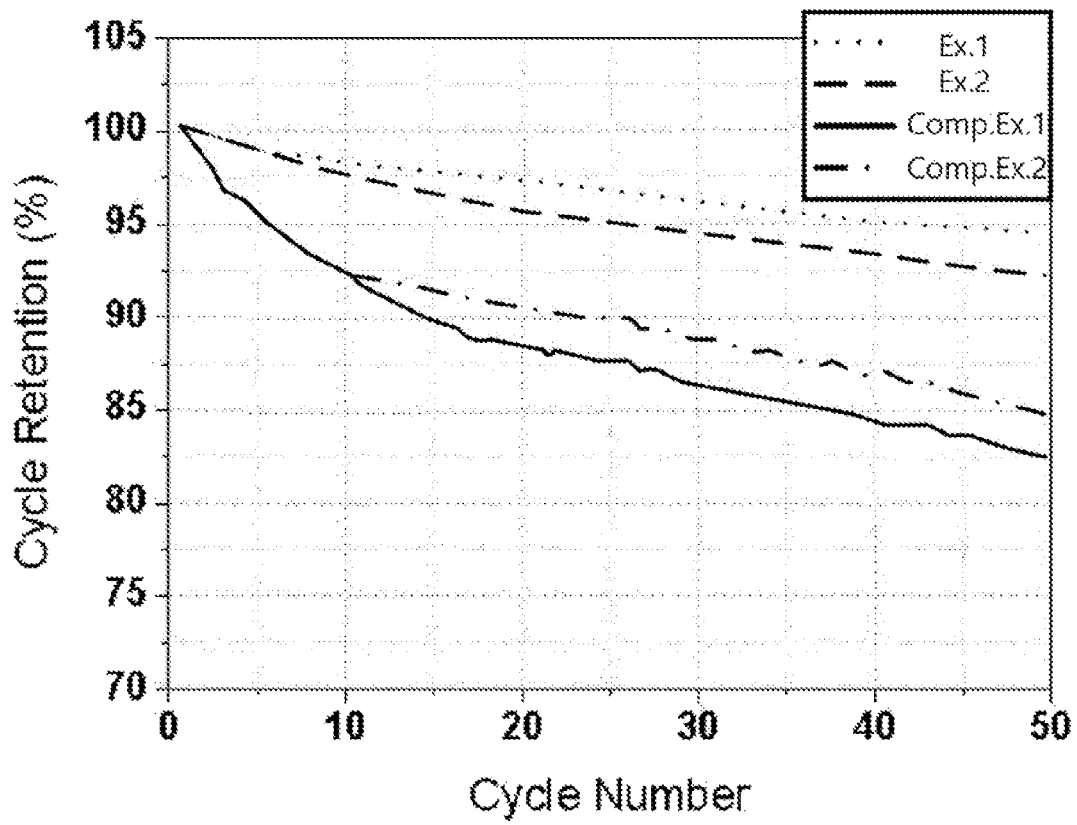
[FIG. 7]

METHOD OF MANUFACTURING SEPARATOR-COMPOSITE ELECTRODE COMPRISING MULTILAYER-STRUCTURED INORGANIC LAYER AND SEPARATOR-COMPOSITE ELECTRODE MANUFACTURED THEREBY

TECHNICAL FIELD

This application claims the benefit of priority to Korean Patent Application No. 2020-0011990 filed on Jan. 31, 2020, and Korean Patent Application No. 2021-0005334 filed on Jan. 14, 2021, the disclosures of which are incorporated herein by reference in their entireties.

The present invention relates to a method of manufacturing a separator-composite electrode including a multilayer-structured inorganic layer and a separator-composite electrode manufactured thereby. Particularly, it relates to a method of manufacturing a separator-composite electrode comprising a first inorganic layer including first inorganic particles having a diameter greater than a pore size of an electrode active material layer of a unit electrode and a second inorganic layer including second inorganic particles having a diameter smaller than the diameter of the first inorganic particles, and a separator-composite electrode manufactured thereby.

BACKGROUND ART

A separator, which is an element constituting a secondary battery, serves to pass an electrolyte and ions. while isolating a positive electrode and a negative electrode from each other to prevent electric short circuit between the two electrodes. The separator itself does not participate in electrochemical reaction of a secondary battery. However, the separator greatly affects the performance and safety of the secondary battery due to physical properties thereof, such as electrolytic solution wettability, porosity, and thermal shrinkage.

A polyolefin-based porous substrate is widely used as a separator for a secondary battery. Since the porous substrate is subject to thermal shrinkage at high temperatures, it does not properly perform its role of isolating the positive electrode and the negative electrode. As a result, safety issues such as short-circuiting of secondary batteries or fire breakout or explosion of batteries have been raised.

In order to compensate for the disadvantages of the porous substrate, a method of adding a coating layer to one surface or both surfaces of the porous substrate and adding various kinds of materials capable of supplementing the disadvantages of the porous substrate to the coating layer or changing the physical properties of the coating layer, has been used. Metal oxide, such as alumina ($Al_2O_3$), or metal hydroxide, such as aluminum hydroxide ($Al(OH)_3$), is added to the coating layer as an inorganic material to inhibit thermal shrinkage of the separator or improve heat resistance.

The coating layer including an inorganic material has a disadvantage in that the adhesion to the electrode is weak. In addition, since the coating layer is added to one surface or both surfaces of the porous substrate, there is also a disadvantage in that the portion of the secondary battery that does not participate in the chemical reaction increases.

In order to improve the disadvantages of such a separator, a separator-composite electrode in which an inorganic coating layer is formed on an electrode active material layer to serve as a conventional separator has been proposed. Since an electrode assembly using the separator-composite electrode does not have a separate porous substrate, there is no concern for thermal shrinkage and hence short circuit. There is also an advantage in that it is possible to minimize the portion of the secondary battery that does not participate in the chemical reaction.

FIG. 1 is a schematic view of a conventional separator-composite electrode. The conventional separator-composite electrode is formed by directly applying or coating an inorganic material on an electrode active material layer 20 or laminating a pre-formed inorganic layer 30 on the electrode active material layer 20. The electrode active material layer 20 is applied to one surface of a current collector 10, and the inorganic layer 30 is applied to the uppermost layer.

In many cases, as shown in FIG. 1, the diameter of particles of the inorganic layer 30 of the conventional separator-composite electrode is smaller than pores of the electrode active material layer 20 formed on the electrode. Although inorganic particles having a small size are used to serve as a separator, the particles of the inorganic layer 30 may block the pores of the electrode active material layer 20 to increase the resistance of the battery. In addition, a binder for adhering the inorganic layer may block the pores of the electrode active material layer 20 formed on the electrode. When the resistance of the battery increases as described above, there is a problem in that a battery capacity decreases and a lifespan of the battery decreases.

Patent Document 1 provides an inorganic particle layer composed of several layers, which is a multilayer structure according to the role of an inorganic coating layer, but does not recognize a structure that does not block pores of an electrode.

Patent Document 2 also relates to an electrode provided with a current collector, an active material layer, and an inorganic layer. Patent Document 2 uses ceramic fillers of various sizes and shapes to increase ionic conductivity of a ceramic separator itself by providing the inorganic layer having a diameter of two or more kinds of particles. However, since this is to improve the performance of the separator itself, Patent Document 2 does not recognize that pores of a battery are blocked or the battery performance is deteriorated.

In order to improve the safety of a secondary battery that is closely used in daily life and to develop a secondary battery that can meet the demands of high capacity and high density, there is a need to provide a separator-composite electrode that does not block pores of an electrode and a secondary battery using the same.

Korean Patent Application Publication No. 2016-0112266 (Sep. 28, 2016) ('Patent Document 1')
Korean Patent Application Publication No. 2008-0082289 (Sep. 11, 2008) ('Patent Document 2')

DISCLOSURE

Technical Problem

The present invention has been made in view of the above problems, and it is an object of the present invention to provide a method of manufacturing a separator-composite electrode having low resistance as well as no deterioration of battery performance by not blocking pores of an electrode active material layer, wherein the separator-composite electrode is provided with a multilayer-structured inorganic layer serving as a separator attached to one surface of an electrode without a separate separator. Since the present invention has no separate separator and the multilayer-structured inorganic layer serving as a separator does not include a polymer substrate, it is also an object of the present invention to provide the separator-composite electrode having excellent safety even at high temperatures.

Technical Solution

In order to accomplish the above object, the present invention provides a method of manufacturing a separator-composite electrode including S1) manufacturing a first inorganic layer slurry comprising first inorganic particles and a first binder and having a viscosity of 5000 cP to 20000 cP; S2) manufacturing a second inorganic layer slurry comprising second inorganic particles and a second binder; S3) preparing a unit electrode in which an electrode active material layer is formed on at least one surface of an electrode current collector; and S4) forming a first inorganic layer comprising the first inorganic layer slurry on at least one surface of the electrode active material layer of the unit electrode of step S3) and a second inorganic layer comprising the second inorganic layer slurry on the first inorganic layer, wherein a D50 diameter of the first inorganic particles is greater than a pore size of the electrode active material layer of the unit electrode, and a D50 diameter of the second inorganic particles is smaller than the diameter of the first inorganic particles, and steps S1) to S3) may be performed in any order, or two or more steps may be performed at the same time.

Step S1) may include mixing the first inorganic particles and a first solvent to manufacture a first inorganic material solution; manufacturing a first binder solution in which the first binder polymer and the first solvent are mixed; and mixing the first inorganic material solution and the first binder solution to manufacture the first inorganic layer slurry.

Step S2) may include mixing the second inorganic particles and a second solvent to manufacture a second inorganic material solution; manufacturing a second binder solution in which the second binder polymer and the second solvent are mixed; and mixing the second inorganic material solution and the second binder solution to manufacture the second inorganic layer slurry.

The first inorganic particles may have a diameter of 500 nm to 3 μm, and the second inorganic particles may have a diameter of 20 nm to 300 nm.

The first inorganic layer slurry in step S1) and/or the second inorganic layer slurry in step S2) may further comprise a dispersant.

The type of the dispersant is not limited as long as it is a material that can be generally used for a battery. For example, the dispersant may be a mixture of one or more selected from the group consisting of an acrylic copolymer. In addition, the dispersant may be a mixture of one or more selected from the group consisting of acids.

The second inorganic particles may be mixed with particles having different diameters.

The second inorganic particles may be manufactured by adding a step of sequentially mixing the particles in the order of small diameter of the particles in step S2).

When mixing the second inorganic particles, a step of mixing a dispersant may be further included between the step of mixing the particles having a small diameter and the step of mixing the particles having a large diameter.

The first inorganic layer slurry may have a higher viscosity than the second inorganic layer slurry.

The second inorganic layer slurry may have a viscosity of 300 cP to 3000 cP.

In step S4), the first inorganic layer slurry and the second inorganic layer slurry may be simultaneously coated on at least one surface of the electrode active material layer of the unit electrode.

In step S4), the first inorganic layer slurry may be applied to at least one surface of the electrode active material layer of the unit electrode and then dried to form the first inorganic layer, and the second inorganic layer slurry may be applied on the first inorganic layer and then dried to form the second inorganic layer.

A step of laminating each of the first inorganic layer and/or the second inorganic layer, after forming the first inorganic layer and/or the second inorganic layer, may be further comprised.

The laminating step may be performed at 50° C. to 200° C.

The first inorganic particles and/or the second inorganic particles may include at least one of AlOOH, Al(OH)$_3$, and Al$_2$O$_3$.

The second inorganic particles may include surface-modified particles.

The first binder polymer and the second binder polymer may be the same material, and may differ only in molecular weight or composition ratio of a copolymer.

The second binder polymer may have a different chemical composition from the first binder polymer.

A molecular structure of the second binder polymer may be branched.

Each of the first inorganic layer and/or the second inorganic layer may have a thickness of 3 μm or more and less than 20 μm. Preferably, the first inorganic layer and/or the second inorganic layer may have a thickness of 3 μm or more and 10 μm or less.

The total thickness of the inorganic layer, which is the sum of the thickness of the first inorganic layer and the thickness of the second inorganic layer, may be less than 30 μm. Preferably, the total thickness of the inorganic layer may be 20 μm or less.

The first inorganic layer and the second inorganic layer may have the same thickness.

The present invention may provide a separator-composite electrode manufactured according to any one of the above-mentioned manufacturing methods.

The present invention also provides an electrode assembly comprising the separator-composite electrode.

The present invention may also include stacking at least one layer of the separator-composite electrode and laminating the stacked separator-composite electrode to manufacture a unit cell.

The unit cell may be used by charging and discharging 20 or more times.

In the present invention, one or more constructions that do not conflict with each other may be selected and combined from among the above constructions.

Advantageous Effects

A method of manufacturing a separator-composite electrode according to the present invention serves to form a first inorganic layer and a second inorganic layer having different diameters and properties of inorganic particles and different physical properties of a slurry forming an inorganic layer, to maintain existing pores of an electrode by the first inorganic layer, to uniformly form pores of the electrode by the second inorganic layer, and to prevent an electrical short circuit.

Since the separator-composite electrode according to the present invention does not have a porous polymer substrate and uses an endothermic inorganic material, it has excellent safety even at high temperatures. In addition, since an electrode active material layer of a unit electrode can maintain the existing pores by the first inorganic layer, it is possible to provide an electrode assembly having a lower resistance than a conventional separator-composite electrode. As the resistance of the electrode assembly decreases, capacity and lifespan of a battery are improved.

The present invention also has an excellent effect of preventing an electrical short circuit compared to the conventional separator-composite electrode by controlling the pore size of the second inorganic layer. In theory, when the pores of the second inorganic layer are reduced to the extent close to the pore size of a conventional polymer porous substrate, the present invention may have an effect of preventing an electrical short circuit to a degree similar to that of the conventional polymer porous substrate and improving durability of the second inorganic layer and the separator-composite electrode.

In addition, since the present invention has no separator substrate, a method of manufacturing an electrode assembly of the present invention is simpler than a conventional method of manufacturing an electrode assembly having a separator substrate, thereby it is possible to simplify an electrode assembly manufacturing method and a lamination process.

DESCRIPTION OF DRAWINGS

FIG. 1 is a schematic view of a conventional separator-composite electrode.

FIG. 2 is a schematic view of a separator-composite electrode according to a first embodiment of the present invention.

FIG. 3 is a schematic view of a separator-composite electrode according to a second embodiment of the present invention.

FIG. 4 is a schematic view of an electrode assembly in which the separator-composite electrode according to the first embodiment of the present invention is stacked.

FIG. 5 is a schematic view of an electrode assembly in which a separator-composite electrode according to a third embodiment of the present invention is stacked.

FIG. 6 is a schematic view of an electrode assembly in which a separator-composite electrode according to a fourth embodiment of the present invention is stacked.

FIG. 7 is a capacity retention graph after 45 times charging and discharging of Comparative Examples and Examples of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described with reference to the embodiments of the present invention. However, this is provided for easier understanding of the present invention and should not be construed as limiting the scope of the present invention.

Hereinafter, the present invention will be described in more detail.

A method of manufacturing a separator-composite electrode according to the present invention includes S1) manufacturing a first inorganic layer slurry comprising first inorganic particles and a first binder and having a viscosity of 5000 cP to 20000 cP; S2) manufacturing a second inorganic layer slurry comprising second inorganic particles and a second binder; S3) preparing a unit electrode in which an electrode active material layer is formed on at least one surface of an electrode current collector; and S4) forming a first inorganic layer comprising the first inorganic layer slurry on at least one surface of the electrode active material layer of the unit electrode of step S3) and a second inorganic layer comprising the second inorganic layer slurry on the first inorganic layer, wherein a diameter of the first inorganic particles is greater than a pore size of the electrode active material layer of the unit electrode, and a diameter of the second inorganic particles is smaller than the diameter of the first inorganic particles, and steps S1) to S3) may be performed in any order, or two or more steps may be performed at the same time.

In step S1), the first inorganic layer slurry may use a method of mixing the first inorganic particles and the first binder in a first solvent at once. In addition, the first inorganic layer slurry may be manufactured by a method including mixing the first inorganic particles and a first solvent to manufacture a first inorganic material solution; manufacturing a first binder solution in which the first binder polymer and the first solvent are mixed; and mixing the first inorganic material solution and the first binder solution to manufacture the first inorganic layer slurry.

After manufacturing the first inorganic material solution as described above, when the step of manufacturing the separately prepared first binder solution is performed, there is an advantage in that it is easier to regulate the viscosity of the first inorganic layer slurry.

The above-described method may also be applied when forming the second inorganic layer slurry.

FIG. 2 shows a schematic view of a first embodiment of a separator-composite electrode manufactured by the manufacturing method according to the present invention.

As shown in FIG. 2, the separator-composite electrode according to the first embodiment of the present invention may include a unit electrode 250 including an electrode current collector 100 having an electrode active material layer 200 formed on one surface of the electrode current collector 100; a first inorganic layer 300 formed on one surface of the unit electrode 250, the first inorganic layer 300 including first inorganic particles having a diameter greater than a pore size of the electrode active material layer 200 of the unit electrode 250 and a first binder polymer; and a second inorganic layer 400 applied to the first inorganic layer 300, the second inorganic layer 400 including second inorganic particles having a diameter smaller than that of the first inorganic particles and a second binder polymer.

The unit electrode 250 includes the electrode current collector 100 and the electrode active material layer 200 formed on at least one surface of the electrode current collector 100. In FIG. 2, the electrode active material layer 200 is formed only on one surface as an example, but the electrode active material layer 200 may be formed on both surfaces.

Therefore, as a possible embodiment of the present invention, a total of 5 combinations may be configured since a unit electrode according to two combinations in which an electrode active material layer is formed on one surface or both surfaces of the electrode current collector, and two combinations of an inorganic layer in which the inorganic layer is formed on one surface or both surfaces of the electrode active material layer of the unit electrode are possible. Specifically, it is possible to provide a total of 5 combinations including two combinations in which the layers according to the present invention are formed on one surface of the electrode current collector, respectively; two combinations in which the electrode active material layers are formed on both surfaces of the electrode current collector and the inorganic layer is formed on one surface, respectively; and one combination in which the inorganic layers are formed on both surfaces.

In general, the electrode current collector 100 may have a thickness of 3 μm to 500 μm. The electrode current collector 100 may have a micro-scale uneven pattern formed on the surface thereof so as to increase the adhesion force of the electrode active material. The current collector may be used in various physical forms, such as those of a film, a sheet, a foil, a net, a porous body, a foam body, and a non-woven fabric body. The material used as the electrode current collector is not particularly restricted, as long as the electrode current collector exhibits high conductivity while the electrode current collector does not induce any chemical change in a battery to which the electrode current collector is applied. As the electrode current collector of the present invention, both a positive electrode current collector and a negative electrode current collector may be used.

The positive electrode current collector may be made of one selected from stainless steel, aluminum, nickel, and titanium. Alternatively, the positive electrode current collector may be made of one selected from aluminum or stainless steel, the surface of which is treated with carbon, nickel, titanium, or silver. Preferably, aluminum may be used. The negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy.

The electrode active material layer 200 may be formed on one surface or both surfaces of the electrode current collector 100. The thickness of the electrode active material layer 200 may vary depending on the capacity of the battery and the type of the active material. In general, the electrode active material layer 200 formed on one surface of the electrode current collector 100 may have a thickness of 3 μm to 500 μm.

When the positive electrode current collector is used in the electrode active material layer 200, a positive electrode active material that can be used may include, for example, a layered compound such as lithium nickel oxide ($LiNiO_2$) or a compound substituted with one or more transition metals; lithium manganese oxide such as the chemical formula $Li_{1+x}Mn_{2-x}O_4$ (wherein x ranges from 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni-site type lithium nickel oxide represented by $LiNi_{1-x}M_xO_2$ (wherein M=Co, Mn, Al, Cu, Fe, Mg, B, or Ga, and x ranges from 0.01 to 0.3); lithium manganese composite oxide represented by $LiMn_{2-x}M_xO_2$ (wherein M=Co, Ni, Fe, Cr, Zn or Ta, and x ranges from 0.01 to 0.1) or $Li_2Mn_3MO_8$ (wherein M=Fe, Co, Ni, Cu or Zn); $LiMn_2O_4$ having a part of Li being substituted with alkaline earth metal ions; a disulfide compound; $Fe_2(MoO_4)_3$ and so forth, without being particularly limited thereto.

When the negative electrode current collector is used, a negative electrode active material that can be used may include, for example, carbon such as non-graphitized carbon and graphite-based carbon; a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0<x≤1; 1≤y≤3; 1≤z≤8); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer, such as polyacetylene; or a Li—Co—Ni-based material.

The electrode active material layer 200 may further include a conductive material and a binder.

The conductive agent is generally added so that the conductive agent accounts for 0.1 wt % to 30 wt % based on the total weight of the mixture including the electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; carbon fluoride powder; metallic powder, such as aluminum powder, or nickel powder; conductive whisker, such as a zinc oxide or potassium titanate; a conductive metal oxide, such as a titanium oxide; or conductive substances, such as polyphenylene derivatives, may be used as the conductive agent.

The binder is a component assisting in binding between an active material and a conductive agent and in binding with a current collector. The binder is generally added in an amount of 0.1 wt % to 30 wt % based on the total weight of the mixture including the electrode active material. Examples of the binder may be polyvinylidene fluoride, polyvinyl alcohol, carboxymethylcellulose (CMC), starch, hydroxypropylcellulose, regenerated cellulose, polyvinyl pyrrolidone, polytetrafluoroethylene, polyethylene, polypropylene, ethylene-propylene-non-conjugated diene (EPDM), sulfonated EPDM, styrene butadiene rubber, fluoro rubber, and various copolymers.

The electrode active material may have a uniform particle diameter and shape, but various particles having different sizes and shapes may be used. The particle of the electrode active material may have a diameter of 800 nm to 20 μm. In addition, the particles may have various shapes such as a spherical shape or a rod shape.

The electrode current collectors 10 and 100 and the electrode active material layers 20 and 200 are equally applied to an electrode current collector and an electrode active material layer described below.

A first inorganic layer 300 is disposed on at least one surface of the electrode active material layer 200 of the unit electrode 250, and a second inorganic layer 400 is always disposed on an upper surface of the first inorganic layer.

The first inorganic layer 300 may include first inorganic particles having a diameter greater than the pore size of the electrode active material layer 200 of the unit electrode 250, and a first binder polymer for fixing the first inorganic particles.

In addition, the second inorganic layer 400 may include second inorganic particles having a diameter smaller than that of the first inorganic particles, and a second binder polymer for fixing the second inorganic particles.

In various possible configurations, the first inorganic layer 300 and the second inorganic layer 400 may exist as separate layers or may be formed as a single layer. When the first inorganic layer 300 and the second inorganic layer 400 exist as a single layer, the second inorganic particles 410 may be packed in pores of the first inorganic particles 310, as shown in FIG. 3. In this case, the weight of the first inorganic particles 310 may be 50% to 90% based on the total weight of the inorganic particles, and the weight of the second inorganic particles 410 may be included 10% to 50% based on the total weight of the inorganic particles. This is because when the composition ratio of the second inorganic particles 410 is increased, the second inorganic particles 410 having a small particle diameter may enter the pores of the electrode active material layer to increase resistance. When the inorganic particles are packed as shown in FIG. 3, the first inorganic layer slurry including the first inorganic particles 310 and the second inorganic layer slurry including the second inorganic particles 410 have similar viscosity. This is to prevent the second inorganic particles and the second binder polymer from penetrating into the pores of the electrode active material.

When the first inorganic layer 300 and the second inorganic layer 400 exist as separate layers, the first inorganic layer 300 may be located between the unit electrode 250 and the second inorganic layer 400. In this case, the first inorganic layer 300 may have a thickness of 3 µm or more and less than 20 µm. When the first inorganic layer 300 is 20 µm or more, there is a problem in that the battery capacity decreases due to an increase in resistance. When the first inorganic layer 300 is less than 3 µm, the effect of preventing the inorganic material from penetrating into the pores of the electrode, as intended in the present invention, is not exhibited. In addition, since there is no effect of electrical insulation, a short circuit occurs. The second inorganic layer 400 may have a thickness of 3 µm or more and less than 20 µm. When the thickness of the second inorganic layer 400 is 20 µm or more, which is the same as the first inorganic layer 300, there is a problem in that the battery capacity decreases due to an increase in resistance. When the thickness of the second inorganic layer is too thin, there is a problem in that the pore size of the entire inorganic layer cannot be reduced, and thus the second inorganic layer cannot serve as an insulating layer, and a short circuit of the battery may occur.

The first inorganic layer 300 may be formed to be thinner than the thickness of the second inorganic layer 400. The first inorganic layer 300 is formed such that the second inorganic particles constituting the second inorganic layer 400 do not penetrate the pores of the electrode. Therefore, the first inorganic layer 300 may serve as a boundary between the unit electrode and the inorganic layer. When the thickness difference between the first inorganic layer 300 and the second inorganic layer 400 is too large, the second inorganic particles of the second inorganic layer may penetrate into the pores of the unit electrode 250. Therefore, it is preferable that the first inorganic layer 300 have a thickness similar to that of the second inorganic layer 400. That is, it is preferable that the first inorganic layer 300 have a thickness of 0.6 to 1 times the thickness of the second inorganic layer 400.

When the thicknesses of the first inorganic layer 300 and the second inorganic layer 400 corresponding to a separator become thick, the capacity retention rate according to the charge/discharge cycle may drop sharply. Preferably, the first inorganic layer 300 and the second inorganic layer 400 may have a thickness of 6 µm or more and 40 µm or less. The thicknesses of the first inorganic layer 300 and the second inorganic layer 400 are equally applied to all embodiments of the present invention.

In order to obtain a separator-composite electrode in which an inorganic material does not penetrate into a battery, two types of inorganic materials may be used in one layer, or inorganic materials having different sizes, distributions, shapes, and etc. may be mixed in a plurality of layers. However, when the inorganic layer is too thick, the resistance increases. Therefore, it is necessary to adjust the number of layers having the same pore size as a conventional separator substrate while preventing the inorganic particles from penetrating into the unit electrode. However, it is appropriate to arrange the inorganic layer in 5 or less layers.

In the case of a multilayer as described above, the average pore size of the entire inorganic layer may be 0.01 µm to 10 µm, and the average porosity may be 10% to 95%. The sum of the thicknesses of the multilayered inorganic layers should be 6 µm or more and less than 40 µm. This is a range in which the resistance of the battery can be minimized while exhibiting the electrode insulation effect.

The diameter of the first inorganic particles may be greater than the pore size of the unit electrode 250.

The first inorganic layer 300 may serve to prevent an inorganic material from penetrating into the pores of the unit electrode 250. The particles of the first inorganic layer 300 may have a diameter of 500 nm to 3 µm. However, the diameter of the particles of the first inorganic layer 300 may vary depending on the type of electrode to be used and the material facing each other. Since an electrode including a negative electrode active material and a negative electrode current collector has an average pore size of 0.5 µm to 1 µm, the first inorganic layer may have a diameter of 0.5 µm to 8 µm. In addition, in the case of a positive electrode including a positive electrode active material and a positive electrode current collector, since the pores are slightly larger than this, the first inorganic layer 300 may have a diameter of 1 µm to 8 µm. The size of this diameter can be measured using an SEM or a particle size analyzer (Product name: MASTERSIZER 3000; Manufacturer: Malvern).

The first inorganic layer 300 may be formed using inorganic materials having different diameters to form a boundary. Inorganic materials having the same diameter may be used as long as the inorganic materials having the same diameter form a boundary so that the second inorganic material 400 does not penetrate into the pores of the electrode.

The second inorganic particles may have a diameter smaller than the pore size of the electrode active material layer 200 of the unit electrode 250. In the separator-composite electrode, the second inorganic particles serve to prevent a short circuit of the battery and maintaining ionic conductivity by allowing the inorganic layer to have the same pore size and porosity as in the conventional separator. The diameter of the second inorganic particles may vary depending on the size of the active material to be used, but may be in the range of 20 nm to 300 nm. More preferably, it may be 20 nm to 150 nm for insulation.

In addition, two types of inorganic particles having different sizes may be used as the second inorganic particles for insulation. In the two types of inorganic particles having different sizes, the largest inorganic particles may have a diameter (D50) of 60 nm to 300 nm, and the smallest inorganic particle may have a diameter (D50) of 20 nm to 80 nm.

When using inorganic particles having different sizes as described above, it is preferable to first mix inorganic particles having a small diameter, and then mix them in the order of a larger particle diameter to form an inorganic layer slurry. At this time, after mixing the inorganic particles having a small size, mixing a dispersant to prevent the inorganic particles having a small size from agglomerating, and then mixing the inorganic particles having a large size is more efficient in lowering the resistance of the electrode. Inorganic materials having different particle diameters may vary depending on the type, use, and components of the inorganic substance. However, it is preferable that the particles of the inorganic material having a large diameter be included in a range similar to the particles of the inorganic material having a small diameter, which is about 0.5 to 4 times the particles of the inorganic material having the same or a small diameter.

The first inorganic particles may have various shapes, such as a spherical shape, an elliptical shape, a dumbbell shape, a tetrapod shape, and an amorphous shape. In order to facilitate the formation of a boundary on the unit electrode, when forming a layer, it is preferable to have a shape capable of forming a shape capable of preventing the second inorganic particles from passing through the first inorganic layer 300, such as a net structure. In addition, it is possible to further include a single-layer net structured layer by introducing an additional material.

The second inorganic particles may be of various shapes, but a spherical shape is preferable since the pore size and porosity of the inorganic layer can be controlled.

The first inorganic layer 300 and the second inorganic layer 400 may serve as insulating layers. The type of the inorganic material for the first inorganic particles and the second inorganic particles used in the insulating layer is not particularly limited as long as oxidation and/or reduction reactions do not occur in an operating voltage range of a secondary battery. When inorganic particles having ion transfer ability are used, battery performance may be improved by raising ionic conductivity in an electrochemical device. When the inorganic particles having a high dielectric constant are used, a dissociation degree of an electrolyte salt in a liquid electrolyte, namely, a lithium salt, is increased and thereby ionic conductivity of an electrolyte may be improved.

The first inorganic particles and the second inorganic particles may be chemically different materials. As the material of the first inorganic particles and the second inorganic particles, inorganic particles generally used for a separator may be used. In addition, the first inorganic particles and the second inorganic particles according to the present invention may use chemically different materials as described above, but the same material may be used.

Examples of the first inorganic particles and the second inorganic particles include $BaTiO_3$, $SnO_2$, $CeO_2$, MgO, $Mg(OH)_2$, NiO, $CaCO_3$, CaO, ZnO, $ZrO_2$, $Y_2O_3$, $SiO_2$, $Al(OH)_3$, AlOOH, $Al_2O_3$, $TiO_2$, or a mixture thereof. Thereamong, it is preferable to use $Al(OH)_3$ and AlOOH, which are excellent in safety due to heat absorption properties at high temperature.

The second inorganic particles may be surface-modified particles. Such surface modification may be a surface treatment to have hydrophilic properties. The surface treatment may be to treat the inorganic particles with an acidic solution. Any material may be used as the acidic solution as long as it is a material capable of imparting only hydrophilic properties while maintaining the insulating properties of inorganic materials. Plasma surface treatment may be used for the surface treatment.

The content of the first inorganic particles or the second inorganic particles in the first inorganic layer or the second inorganic layer may be 50 parts by weight to 95 parts by weight, preferably 60 parts by weight to 95 parts by weight, based on 100 parts by weight of the entire solid content of each of the first inorganic layer or the second inorganic layer. In the case in which the content of the first inorganic particles or the second inorganic particles is less than 50 parts by weight based on 100 parts by weight of the entire solid content of the first inorganic layer or the second inorganic layer, the content of a binder is too large, whereby the number of empty spaces formed between inorganic particles is reduced. As a result, the pore size and porosity of the inorganic layer may be reduced, and therefore performance of the battery may be rather reduced. Also, in the case in which the content of the inorganic material is greater than 95 parts by weight based on 100 parts by weight of the entire solid content of the inorganic layer, the content of the binder is too small, whereby the force of adhesion between the inorganic particles may be reduced, and therefore an electrical short circuit may occur.

The first binder polymer used in the first inorganic layer 300 serves to prevent the second inorganic particles from passing through the first inorganic layer and penetrating into the unit electrode while allowing the first inorganic particles to bind to each other. Any material may be used as the first binder polymer as long as the first binder polymer can provide a bonding force without affecting the battery. Materials that can be used as the binder may be any one selected from the group consisting of polyvinylidene fluoride-hexafluoropropylene, polyvinylidene fluoride-trichloroethylene, polymethylmethacrylate, polybutylacrylate, polyacrylonitrile, polyvinylpyrrolidone, polyvinylacetate, polyethylene-co-vinylacetate, polyethyleneoxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxylmethylcellulose, or a mixture of two or more thereof.

The second binder polymer serves to allow the second inorganic particles to bind to each other. Any material may be used as the second binder polymer as long as the second binder polymer can provide a bonding force without affecting the battery. For example, the second binder polymer may be any one selected from the group consisting of polyvinylidene fluoride-hexafluoropropylene, polyvinylidene fluoride-trichloroethylene, polymethylmethacrylate, polybutylacrylate, polyacrylonitrile, polyvinylpyrrolidone, polyvinylacetate, polyethylene-co-vinylacetate, polyethyleneoxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxylmethylcellulose, or a mixture of two or more thereof.

The first inorganic layer slurry may have a higher viscosity than the second inorganic layer slurry. Since the first inorganic layer slurry has a higher viscosity than the second inorganic layer slurry, the first inorganic layer slurry serves to prevent the binder of the first inorganic layer from penetrating into the unit electrode, and to prevent the second inorganic particles of the second inorganic layer 400 from penetrating into the unit electrode. For example, a first inorganic layer forming slurry including the first inorganic layer slurry may have a viscosity of 5,000 cP to 20,000 cP, and the second inorganic layer slurry including the second binder polymer may have a viscosity of 300 cP to 3000 cP.

The viscosity of the inorganic layer slurry may vary depending on the binder polymer included in each inorganic layer.

The first binder polymer may be the same material as the second binder polymer, and may differ only in molecular weight or composition ratio of the copolymer. The weight average molecular weight of the first binder polymer may be 600,000 to 1.3 million, and the weight average molecular weight of the second binder polymer may be 200,000 to 1.2 million. The first binder polymer may be 5 parts by weight to 45 parts by weight based on 100 parts by weight of the entire solid content of the first inorganic layer 300. In addition, the second binder polymer may be 5 parts by weight to 30 parts by weight based on 100 parts by weight of the entire solid content of the second inorganic layer 400.

The first binder polymer may be a material chemically different from the second binder polymer. In this case, the material is not limited as long as the first binder polymer has a higher viscosity than the second binder polymer.

A molecular structure of the second binder polymer may be branched. In this case, the first binder polymer may have a linear molecular structure having a higher viscosity than the second binder polymer. However, the molecular structure is indicated as an example, and when the viscosity of the first binder polymer is higher than that of the second binder polymer, the structure may be variously selected.

The first binder polymer and the second binder polymer may be selected by varying one or more of the aforementioned molecular weight, composition ratio, molecular structure, and chemical components.

In addition, the viscosity of the inorganic layer slurry varies depending on the weight ratio of materials such as inorganic particles, binder polymer, and a dispersant included in the inorganic layer slurry. Alternatively, the viscosity of the inorganic layer slurry may vary depending on the ratio of the solid content and the solvent included in the inorganic layer slurry.

The electrode current collector may use both a positive electrode current collector and a negative electrode current collector. The electrode active material may be mixed with a binder or the like and applied on the electrode current collector in the form of a slurry. Examples of a method of coating the slurry including the electrode active material (hereinafter referred to as 'electrode slurry') on the current collector include a method of forming a slurry, distributing the slurry on the current collector, and uniformly dispersing the slurry using a doctor blade, a die casting method, a comma coating method, a screen printing method, or a gravure coating method. In addition, a method of forming an electrode slurry formed on a separate substrate and then bonding the slurry to the current collector by a pressing or lamination method may be considered. The thickness of the final coating may be adjusted by adjusting the coating gap, the concentration of the electrode slurry solution or the number of times of coating.

After the electrode slurry is formed, a process of drying it may be performed. The drying process is a process of removing a solvent and moisture in the electrode slurry coated on the electrode current collector, and specific conditions, such as the process procedure and time, may vary depending on the solvent used. For example, the drying process may be performed in a vacuum oven at a temperature of 50° C. to 200° C. For example, drying using warm air, hot air, or low-humidity air, vacuum drying, or drying based on (far) infrared or electron beam radiation may be used as a drying method. Drying is generally performed within a range of 30 seconds to 24 hours, although the drying time is not particularly defined.

After the drying process, a cooling process may be further included, and the cooling process may be a process of slowly colling to room temperature so that the recrystallized structure of the binder is well formed.

Further, if necessary, after the draying process, in order to increase the capacity density of the electrode and increase the adhesion between the current collector and the active materials, a laminating process of passing the electrode between two rolls heated at high temperature and compressing the electrode to a desired thickness can be performed. The laminating process is not particularly limited in the present invention, and a known laminating (pressing) process is possible. For example, the pressing process is performed by passing between rotating rolls or by using a flat press machine.

The drying process, cooling process, and laminating process may be performed after each step S1), S2), and S3), or may be performed only after step S3).

The first inorganic layer may be formed by applying a first slurry including the first inorganic particles and the first binder polymer on at least one surface of the unit electrode. Each of the first inorganic particles and the first binder polymer may be dissolved in a solvent to form the first inorganic layer slurry obtained by mixing them. The second inorganic layer slurry including the second inorganic particles and the second binder polymer may also be formed in a similar manner to the first inorganic layer slurry. At this time, the first inorganic particles and/or the second inorganic particles may be evenly dispersed using a dispersing agent.

The solvent is not limited as long as it does not affect a battery and dissolves the binder polymer. Examples of the solvent include any one of acetone, polycarbonate, methylethylketone, tetrahydrofuran, methylene chloride, chloroform, dimethylformamide, N-methyl-2-pyrrolidone (NMP), cyclohexane, water, or a mixture thereof. The solvent used in the first slurry and the solvent used in the second slurry may be the same or different. In the first slurry, the solvent may be used in an amount of 100 to 500 parts by weight based on 100 parts by weight of the solid content of the first slurry. In the second slurry, the solvent may be used in an amount of 200 to 1000 parts by weight based on 100 parts by weight of the solid content of the second slurry.

Examples of a method of applying the first slurry or the second slurry include a method of forming a slurry, distributing the slurry on the current collector, and uniformly dispersing the slurry using a doctor blade, a die casting method, a comma coating method, a screen printing method, or a gravure coating method. In addition, a method of forming an electrode slurry formed on a separate substrate and then bonding the slurry to the current collector by a pressing or lamination method may be considered. The thickness of the final coating may be adjusted by adjusting the coating gap, the concentration of the electrode slurry solution or the number of times of coating.

In step S4), the first inorganic particles of the first slurry may be applied to form a net structure. When the first inorganic particles of the first slurry form a net structure, it is possible to prevent the second inorganic particles from blocking the pores of the unit electrode through the structure.

In step S4), the first inorganic layer slurry and the second inorganic layer slurry may be simultaneously coated on at least one surface of the unit electrode.

The case in which the first inorganic layer slurry and the second inorganic layer slurry are simultaneously coated includes a case in which the second slurry is applied immediately while the first slurry is applied.

In step S4), after coating and drying the first inorganic layer slurry on at least one surface of the unit electrode, the second inorganic layer slurry may be coated and dried on the first inorganic layer. At this time, it may further include a step of laminating (pressing) after the step of coating and drying each of the first inorganic layer slurry and the second inorganic layer slurry.

The lamination (press) may be a method of rolling or flat pressing the separator-composite electrode at 20° C. to 200° C. The energy density may be increased by reducing the thickness of the separator-composite electrode through the lamination (press).

It is preferable that the lamination (press) be performed only after an electrode layer is formed or only after the second inorganic layer is formed.

The present invention may be a separator-composite electrode manufactured according to the method of manufacturing a separator-composite electrode as described above.

In addition, the present invention may be a method of manufacturing a unit cell including a step of stacking at least two of the aforementioned separator-composite electrodes and laminating them to manufacture a unit cell.

The materials and manufacturing methods mentioned in the above embodiments may be applied equally to the following Examples or Comparative Examples of the present invention.

The electrode assembly may be formed by stacking a separator-composite electrode including the first inorganic layer 300 and the second inorganic layer 400 on one surface as shown in FIG. 4. At this time, the directions of the surfaces on which the first inorganic layer 300 and the second inorganic layer 400 are present may be formed to face one direction. In FIG. 4, active material layers 210 and 220 are shown to exist only on one surface of a negative electrode current collector 110 and a positive electrode current collector 120. However, the active material layers may exist on one surface as shown in FIG. 4, or the active material layers may also exist on both surfaces.

The electrode assembly may be formed by arranging and stacking the separator-composite electrode having the first inorganic layer 300 and the second inorganic layer 400 on a cross section between the electrode current collector and the electrode having only the active material layer as shown in FIG. 4.

In addition, as shown in FIG. 5, which is a third embodiment of the present invention, the electrode assembly may be formed by stacking only the separator-composite electrode having the first inorganic layer 300 and the second inorganic layer 400 on both surfaces.

FIG. 6 is a schematic view of an electrode assembly in which a separator-composite electrode according to a fourth embodiment of the present invention is stacked. The present invention may be an electrode assembly including the separator-composite electrode according to the above description. The electrode assembly does not include a separator substrate.

In the present invention, the unit electrode 250 includes both a unit electrode of a positive electrode and a unit electrode of a negative electrode. In addition, the electrode active material layers 20 and 200, the inorganic layer 30, the first inorganic layer 300, and the first inorganic particles 310, the second inorganic layer 400, and the second inorganic particles 410 also include both a positive electrode and a negative electrode.

Hereinafter, the present invention will be described with reference to the following example. The example is provided only for easier understanding of the present invention and should not be construed as limiting the scope of the present invention.

Example 1-1

S1) Boehmite (first inorganic particles) having a diameter of 500 nm to 3 μm, an NMP solvent (a first solvent), and a dispersant are added and stirred to prepare a first inorganic material solution. Then, a first binder solution, in which a PVdF binder (a first binder polymer) is mixed with an NMP solvent (a first solvent), is mixed with the first inorganic material solution to manufacture a first inorganic layer slurry having a diameter of the slurry particles of 500 nm to 3 μm based on D50 and a viscosity of 10000 cP (solid content of about 29 wt %).

S2) A second inorganic material solution in which Boehmite (a part of second inorganic particles) having a diameter of 20 nm to 80 nm and surface-modified by acid treatment, a dispersant, and boehmite (a part of second inorganic particles) having a diameter of 60 nm to 300 nm are sequentially added to a NMP solvent (a second solvent) and stirred, and a second binder solution mixed with a PVdF binder (a second binder) in an NMP solvent (a second solvent) are mixed to manufacture a second inorganic layer slurry having a diameter of the slurry particles of 150 nm to 1 μm based on D50 and a viscosity of 2000 cP (solid content of about 20 wt %).

S3) A unit electrode of a negative electrode in which a negative electrode active material layer including graphite is formed on one surface of a copper electrode current collector is prepared.

S4) The first inorganic layer slurry is applied on the negative electrode active material layer formed on one surface of the unit electrode in step S3), and then dried to form a first inorganic layer having a thickness of 5 μm. The second inorganic layer slurry having a thickness of 5 μm is applied on the first inorganic layer, and then dried to form a second inorganic layer.

S5) A unit electrode in which a positive electrode active material layer including NCM is formed on one surface of an aluminum electrode current collector on the second inorganic layer in step S4) is stacked to form a unit cell.

Example 1-2

Example 1-2 is formed in the same manner as in Example 1-1, but a unit cell is formed such that the first inorganic layer has a thickness of 10 μm and the second inorganic layer has a thickness of 10 μm.

Comparative Example 1

In Comparative Example 1, a unit cell of Comparative Example 1 is formed in the same manner as in Example 1-1, except that the second inorganic layer slurry is applied on the negative electrode active material layer of the unit electrode in step S4) and then dried to form a second inorganic layer having a thickness of 20 μm, without performing step S1) of Example 1-1.

Comparative Example 2

In Comparative Example 2, a unit cell of Comparative Example 2 is formed in the same manner as in Example 1-2, except that the first inorganic layer slurry in step S1) in Example 1-2 has a viscosity of 2000 cP (solid content of about 20 wt %).

Experimental Example 1—Capacity Measurement Experiment

The unit cells according to Examples and Comparative Examples were charged at 0.3 C and discharged at 0.3 C to measure an initial capacity. The results are shown in Table 1 below.

Experimental Example 2—Resistance Measurement

The unit cells according to Examples and Comparative Examples were charged and discharged at 0.3 C to perform one cycle. Then, after fully charging the unit cells at 0.3 C to 4.2V (SOC 100), only 50% of the discharge capacity of the first cycle was discharged at 0.3 C to maintain DOD 50 (=SOC 50). The unit cells were discharged at 3 C for 10 seconds in the state of DOD 50 (=SOC 50%) to measure the resistance of each unit cell. Table 1 below shows the resistance at DOD 50 (=SOC 50).

Experimental Example 3—Capacity Retention Experiment

The unit cells according to Examples and Comparative Examples were charged and discharged for 50 cycles at 45° C. to calculate the discharge capacity after 50 cycles compared to the first discharge capacity. At this time, the charging was performed at 0.3 C to reach 4.2 V, and the discharge was performed at 1 C to reach 2.5 V. The results are shown in Table 1 below and FIG. 7. In FIG. 7, graphs from top to bottom are Example 1-1, Example 1-2, Comparative Example 1, and Comparative Example 2, respectively.

TABLE 1

|  | Example 1-1 | Example 1-2 | Comparative Example 1 | Comparative Example 2 |
|---|---|---|---|---|
| Cell capacity (mAh) | 69.1 | 67.0 | 65.5 | 66.1 |
| Resistance (Ω) | 2.07 | 2.18 | 2.51 | 2.46 |
| Capacity retention (%) | 94.6 | 92.1 | 82.3 | 84.7 |

As can be seen in Table 1 above and FIG. 7, in Example 1-1 (Ex. 1) and Example 1-2 (Ex. 2) according to the present invention, it can be seen that the cell capacity is higher than that of Comparative Example 1 (Comp. Ex. 1) and Comparative Example 2 (Comp. Ex. 2), and the resistance is also low. As described above, since the cell capacity is large and the resistance is low, it can be seen that in Example 1-1 and Example 1-2, the capacity retention rate after 50 cycles is also higher than that of Comparative Example 1 and Comparative Example 2, when compared with Comparative Example 1 and Comparative Example 2.

Through the above experimental results, as in the present invention, when two or more inorganic layers having different diameters of inorganic particles are formed and the viscosity of the slurry forming the lowermost layer is large, it can be seen that the initial battery capacity, resistance, and capacity retention rate are improved by preventing the second inorganic particles and binder from penetrating into the electrode layer.

Those skilled in the art to which the present invention pertains will appreciate that various applications and modifications are possible based on the above description, without departing from the scope of the present invention.

DESCRIPTION OF REFERENCE NUMERALS 10, 100: Electrode current collectors
110: Negative electrode current collector
120: Positive electrode current collector
20, 200: Electrode active material layers
210: Negative electrode active material layer
220: Positive electrode active material layer
250: Unit electrode
30: Inorganic layer
300: First inorganic layer
310: First inorganic particles
400: Second inorganic layer
410: Second inorganic particles

INDUSTRIAL APPLICABILITY

The present invention relates to a method of manufacturing a separator-composite electrode and a separator-composite electrode using the same, the separator-composite electrode including a first inorganic layer including first inorganic particles having a diameter greater than a pore size of an electrode active material layer of a unit electrode, and a second inorganic layer including second inorganic particles having a diameter smaller than the diameter of the first inorganic particles. Accordingly, the present invention is industrially applicable.

The invention claimed is:

1. A method of manufacturing a separator-composite electrode, comprising:
    manufacturing a first inorganic layer slurry comprising first inorganic particles and a first binder and having a viscosity of 5000 cP to 20000 cP;
    manufacturing a second inorganic layer slurry comprising second inorganic particles and a second binder;
    preparing a unit electrode comprising an electrode active material layer formed on at least one surface of an electrode current collector; and
    forming a first inorganic layer by applying the first inorganic layer slurry on at least one surface of the electrode active material layer; and
    forming a second inorganic layer by applying the second inorganic layer slurry on the first inorganic layer,
    wherein a D50 diameter of the first inorganic particles is greater than a pore size of the electrode active material layer, and a D50 diameter of the second inorganic particles is smaller than the D50 diameter of the first inorganic particles, and
    the manufacturing the first inorganic layer slurry, the manufacturing the second inorganic layer slurry and the preparing the unit electrode are performed in any order, or two or more steps may be performed at the same time.

2. The method according to claim 1, wherein the manufacturing the first inorganic layer slurry comprises:
mixing the first inorganic particles and a first solvent to manufacture a first inorganic material solution;
manufacturing a first binder solution comprising the first binder polymer and the first solvent; and
mixing the first inorganic material solution and the first binder solution to manufacture the first inorganic layer slurry.

3. The method according to claim 1, wherein the manufacturing the second inorganic layer slurry comprises:
mixing the second inorganic particles and a second solvent to manufacture a second inorganic material solution;
manufacturing a second binder solution comprising the second binder polymer and the second solvent; and
mixing the second inorganic material solution and the second binder solution to manufacture the second inorganic layer slurry.

4. The method according to claim 1, wherein
the first inorganic particles have a diameter of 500 nm to 3 μm, and
the second inorganic particles have a diameter of 20 nm to 300 nm.

5. The method according to claim 1, wherein the first inorganic layer slurry and/or the second inorganic layer slurry further comprises a dispersant.

6. The method according to claim 1, wherein the second inorganic particles have different diameters.

7. The method according to claim 6, wherein the second inorganic slurry is manufactured by sequentially adding the second inorganic particles in an order from smaller to larger diameters.

8. The method according to claim 7, wherein the second inorganic particles are manufactured by further comprising mixing a dispersant between the adding the second inorganic particles having a smaller diameter and the adding the second inorganic particles having a larger diameter.

9. The method according to claim 1, wherein the first inorganic layer slurry has a higher viscosity than the second inorganic layer slurry.

10. The method according to claim 1, wherein the second inorganic layer slurry has a viscosity of 300 cP to 3000 cP.

11. The method according to claim 1, wherein, in the forming the first inorganic layer and the forming the second inorganic layer, the first inorganic layer slurry and the second inorganic layer slurry are simultaneously coated on at least one surface of the electrode active material layer.

12. The method according to claim 1, wherein, in the forming the first inorganic layer and the forming the second inorganic layer, the first inorganic layer slurry is applied to at least one surface of the electrode active material layer and then dried to form the first inorganic layer, and the second inorganic layer slurry is applied on the first inorganic layer and then dried to form the second inorganic layer.

13. The method according to claim 12, wherein the forming the first inorganic layer and the forming the second inorganic layer further comprise laminating each of the first inorganic layer and/or the second inorganic layer, after forming the first inorganic layer and/or the second inorganic layer.

14. The method according to claim 13, wherein the laminating is performed at 20° C. to 200° C.

15. The method according to claim 1, wherein the first inorganic particles and/or the second inorganic particles comprise at least one of AlOOH, $Al(OH)_3$, or $Al_2O_3$.

16. The method according to claim 1, wherein the second inorganic particles comprise surface-modified particles.

17. A separator-composite electrode manufactured by the method according to claim 1.

18. A method of manufacturing an electrode assembly comprising stacking at least one layer of the separator-composite electrode according to claim 17 and laminating the stacked separator-composite electrode to manufacture a unit cell.

19. An electrode assembly comprising the separator-composite electrode according to claim 17.

* * * * *